United States Patent
Sarayeddine et al.

[11] Patent Number: 6,115,183
[45] Date of Patent: *Sep. 5, 2000

[54] LIGHTING DEVICE

[75] Inventors: Khaled Sarayeddine, Schilligheim; Eric Marcellin-Dibon, Strasbourg; Valtor Drazic, Soufflenheim, all of France

[73] Assignee: Thomson multimedia S.A., France

[*] Notice: This patent issued on a continued prosecution application filed under 37 CFR 1.53(d), and is subject to the twenty year patent term provisions of 35 U.S.C. 154(a)(2).

[21] Appl. No.: 08/632,934

[22] Filed: Apr. 16, 1996

[30] Foreign Application Priority Data

Apr. 28, 1995 [FR] France ................................ 95 05112

[51] Int. Cl.⁷ .................................................. G02B 27/10
[52] U.S. Cl. ........................................... 359/622; 359/626
[58] Field of Search ..................... 359/624, 619, 359/622, 623, 625, 626; 349/6, 7, 57, 62, 63, 67

[56] References Cited

U.S. PATENT DOCUMENTS

| | | | |
|---|---|---|---|
| 4,124,279 | 11/1978 | Byles | 349/63 |
| 4,733,944 | 3/1988 | Fahlen et al. | 359/624 |

FOREIGN PATENT DOCUMENTS

| | | |
|---|---|---|
| 0552725 | 7/1993 | European Pat. Off. . |
| 0609055 | 8/1994 | European Pat. Off. . |
| 0615148 | 9/1994 | European Pat. Off. . |

OTHER PUBLICATIONS

Patent Abstracts of Japan, vol. 16, No. 313, Jul. 9, 1992 & JP-A-04 088317 (Sharp).
Patent Abstracts of Japan, vo. 17, No. 448, Aug. 17, 1993 & JP-A-05 100331 (Toshiba) Apr. 23, 1993.
IBM Technical Disclosure Bulletin, vol. 36, No. 09b, Sep. 1993 pp. 453–456, "Improved Liquid Crystal Display Panel Illumination".

*Primary Examiner*—Ricky Mack
*Attorney, Agent, or Firm*—Joseph S. Tripoli; Peter M. Emanuel; Frederick A. Wein

[57] ABSTRACT

The disclosure relates to a device for illumination of a screen, notably a liquid-crystal screen. It includes a light integrator that receives a light beam from a source and outputs an illuminating beam for the screen. The light integrator makes use of lenses, but has no lenses in the parts of the beam where the energy flux is weak, which enables more uniform illumination of the screen. To improve the contrast of the illumination of the liquid-crystal screen, the whole illuminating beam is directed onto the screen at an angle to the optical axis of the system. The invention is applicable to liquid-crystal screens.

13 Claims, 18 Drawing Sheets

+

+

+

=

LIGHTING DEVICE

BACKGROUND OF THE INVENTION

The present invention concerns a lighting device, notably a lighting device used in a projection or display apparatus, in particular a device used to illuminate an electro-optical screen such as a liquid-crystal display (LCD).

DESCRIPTION OF THE PRIOR ART

A projection device comprises essentially a lighting system to illuminate at least one image on a screen, for example a liquid-crystal screen, by transparency in the manner of a slide projector. An image is generated and projected on a screen by means of an optical projector.

An efficient illumination system typically includes a halogen (or xenon, or filament) lamp and a parabolic reflector to reflect the light (FIG. 1). Present systems of this type have many disadvantages. The shape of the light beam being different from that of the screen, the illumination is not uniform and there is considerable wastage of light. For a screen of 16/9 format these losses are at least 46%, or even more (as much as 60% or 70%) if the liquid-crystal screen must be fitted with a polarizer and a polarization analyzer, since the source is not polarized.

Many solutions for this problem are described in the document EP 90201000.8. These solutions exploit the properties of the optical integrator. FIG. 2 illustrates the principle of optical integration: a light source S is projected onto a second set of lenses RL2 by means of a first set of lenses RL1. Each individual lens of the first set is then projected on the surface of the screen C1 to be illuminated by this second set of lenses. The shape and size of each individual lens RL1 is such that the image on the screen has the shape and size of this screen. Owing to the geometry of the individual lens, the superposition of the images of the lenses RL1 can have the same shape as the screen to be illuminated. In this way we make use of a maximum amount of light reflected by the reflector, thereby increasing the light flux and the overall efficiency of the system.

The European Patent Application n°90 201000.8 describes imagery systems that incorporate illumination systems. They include a light source having any orientation, a concave reflector and lenses of all types and shapes (ordinary lenses, Fresnel lenses, etc.). These lenses are always arranged in a regular fashion (FIG. 3a) in rows and columns, or offset in such a way as to cover optimally the aperture of the reflector (FIG. 3b). Moreover, the set of lenses is always arranged so that the common boundary of four lenses coincide with the optical axis of the light beam (FIG. 4).

We notice that an optical integrator increases the angular spread of the illumination of the image on the liquid-crystal screen. However, it is known that the contrast of an image on this type of screen decreases as the illumination angle increases.

If we consider an illumination system in which an arc lamp is located in a spherical, parabolic or elliptical reflector, as shown in FIG. 1, we see that the lamp must be positioned inside the reflector and therefore there has to be an opening in the rounded part of the reflector. This means that the illumination projected by the reflector has a central area without light, as shown in FIG. 6 which shows the illumination from a parabolic mirror. In FIG. 7a the interruption of the illumination is located practically in the middle of the integrator.

As shown in FIG. 9, this results in a depression in the light distribution in the middle of the image.

The object of the invention is to resolve this disadvantage.

Furthermore, prior-art projectors for liquid-crystal screens have low luminous yield, which is explained by the various attenuations suffered by the light flux:

a) the light source not being polarized, there is a loss of at least 50% of the flux;

b) the format of the LCD modulators (valves) is 16:9, which results in a loss of 46%;

c) the cutting efficiency of the white spectrum of the lamp: 50 at 50%;

d) other factors may also lead to light losses, but the main reason is the geometric spread of the light source. The more the light flux is collimated, the higher the illumination efficiency.

Several solutions exist to overcome these problems. They involve an increase in the spread of the light source and in some cases in the number of components and therefore the complexity of the illumination system.

In a first solution, described in "Efficient optical configuration for polarized white light illumination of 16/9 LCDs in projection display" by C. Nicolas, B. Loiseaux, J-P. Huignard, A. Dupont, SID Japan, October 1992, two orthogonal polarization components s and p are separated, for example by a polarizing beam splitter (PBS) and the polarization plane is rotated, for example by using a half-wave plate. This method is limited by the low angular tolerance of PBSs.

A second solution, described in "Novel polarized liquid-crystal color projection and new TN-LCD operating modes" M. Schatt, J. Fünfschelling, SID 90 DIGEST, Las Vegas, Nev. pp324–326, makes use of new liquid-crystal components of cholesteric type for the functions of separation, modulation, etc.

Other methods use a solution in which the unwanted polarization is normally reflected and then recovered instead of being absorbed (see for example the European patent application n°0 422 611).

Lamps used in LCD projection are typically of arc type (halogen or xenon). In most cases the illumination system is the classical arrangement of a lamp located at the focus of a parabolic reflector, or at the focus of an elliptic reflector with a condenser. The uniformity of the illumination of the liquid-crystal valve is adjusted by a defocusing of the lamp in the reflector. The two major problems associated with this approach is that the illumination is circular and not rectangular, as mentioned earlier, and that the angle of the cone of light delivered by this system in not well adapted to the angle of acceptance of the LCD valve or, more generally, to the contrast conoscope of a TN liquid-crystal valve.

FIGS. 16a to 16d show two types of lamps used in LCD projection: FIGS. 16a and 16b show metallic halogen lamps; FIGS. 16c and 16d show Xe type arc lamps. We notice that in both cases these lamps, once they are positioned in a parabolic or elliptic reflector, block the rays closest to the optical axis owing to their size. This blocking is inevitable given the size and position of the lamps. If we look closer at the distribution of the light intensity within the illumination cone (the solid angle subtended by the section illuminated), we see that this distribution is bell-shaped on each side of the optical axis: there is some loss of light at the center, maximal illumination at an angle $\pm\beta$ (about 2° to 4°) (see FIGS. 17a and 17b).

The liquid-crystal cell is illuminated in most cases at a non-zero average angle of incidence: about 6° to be at the angle of optimal contrast of the liquid-crystal cell (see FIGS. 18a and 18b). Therefore, if the liquid-crystal cell is tilted through +βmax, corresponding to the angle of maximum contrast, then −βmax will be completely outside the cone of acceptance of the LCD.

Moreover, the projection objective (FIGS. 19a to 19c) associated with an optical system with three valves or monovalves depends essentially on the solid angle subtended by the liquid-crystal valve. If this angle is large, the projection objective will be more costly. If we examine the distribution of light intensity within the classical illumination cone, we observe that a central dead angle of ±1° is not used since it carries no energy (see FIG. 19a). If the distribution of this energy changes from a double bell form (FIG. 19b), with β=±6°, to a centered bell form (FIG. 19c) then we can ignore the supplementary ±1° on the edges of this bell and thereby devise a smaller aperture for the projection objective.

In effect, $f/\#=1/[2.\sin(6)°=4.78$; if the distribution changes and we can change to ±5° for example, then f/# becomes 5.73. This operation is performed without major losses of light and also represents a notable advantage in terms of design and price of the projection objective.

SUMMARY OF THE INVENTION

The present invention overcomes the disadvantages described above.

It relates to a device for illumination of a first surface, including:

a light source emitting a beam in one direction;

a first set of lenses forming a second surface perpendicular to the direction of the beam, each lens focusing the light of the beam on a point or line of a third surface;

a second set of lenses located on said third surface, each one imaging the light from one or more lenses of said first set of lenses on said first surface to be illuminated;

wherein the sections of said beam that carry the least light energy are spread over several lenses of said first set of lenses.

According to the invention, lenses may also be provided for the section of said beam that carry the least light energy.

In a variant of the invention, said surface to be illuminated includes a liquid-crystal screen and said sets of lenses only include lenses covering substantially half the section of said light beam emitted by said light source.

The invention also enables the contrast of a liquid-crystal screen to be improved.

The invention also relates to a device including a system of reflection comprising a first mirror reflecting the light of a lamp towards a second concave mirror, the perpendicular section of the beam reflected from said system of reflection lying on one side only of said plane.

The invention is therefore applicable to the illumination of liquid-crystal screens.

BRIEF DESCRIPTION OF THE DRAWINGS

The invention will be better understood and other advantages and characteristics will become clear on reading the following description making reference to the appended figures, of which.

DETAILED DESCRIPTION OF THE PREFERRED EMBODIMENTS

The invention enables any non-homogeneity of the illuminating source to be attenuated. For example, as mentioned earlier, the location of the lamp in the reflector requires a hole to be made in this reflector, which is of course a non-reflecting zone.

Figure 7A:
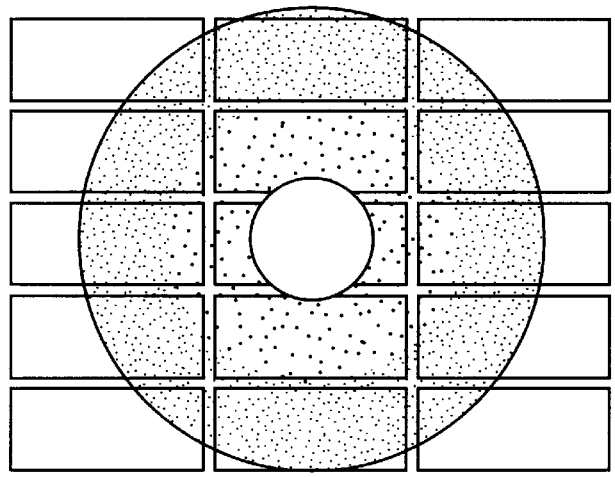
Figure 7B:
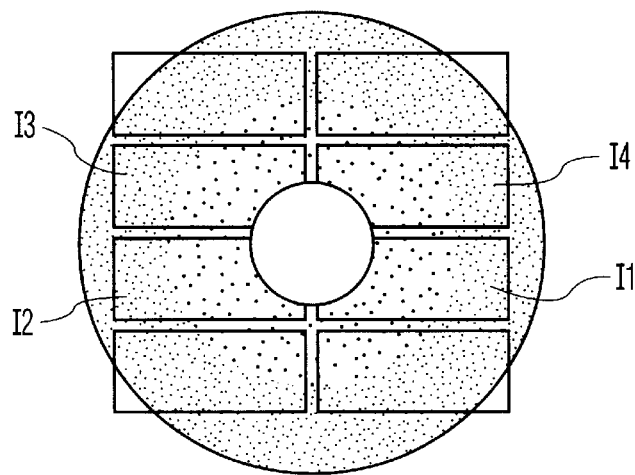
Figure 8A:
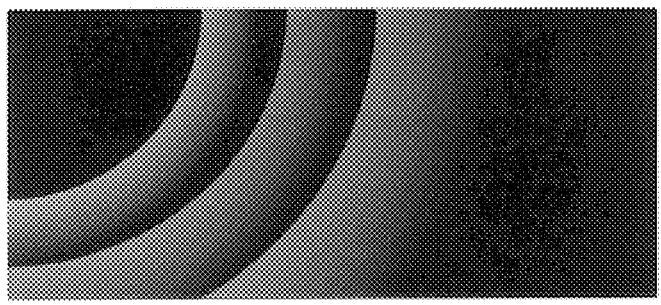
Figure 8B:
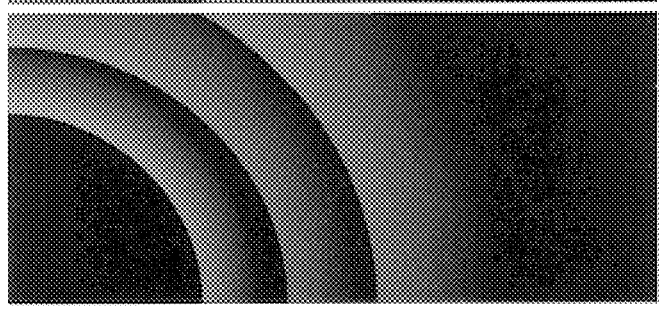
Figure 8C:
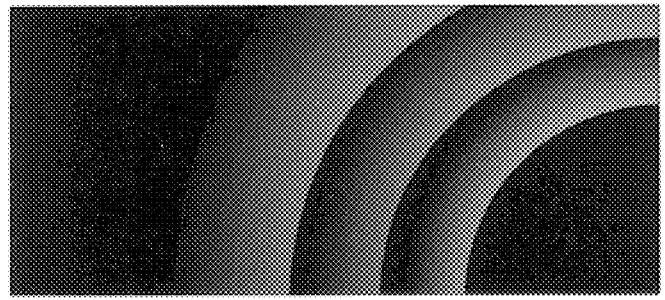
Figure 8D:
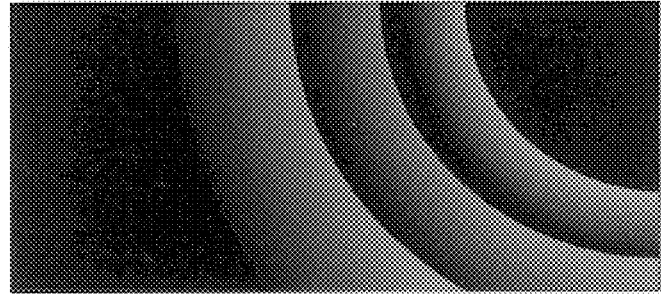
Figure 8E:
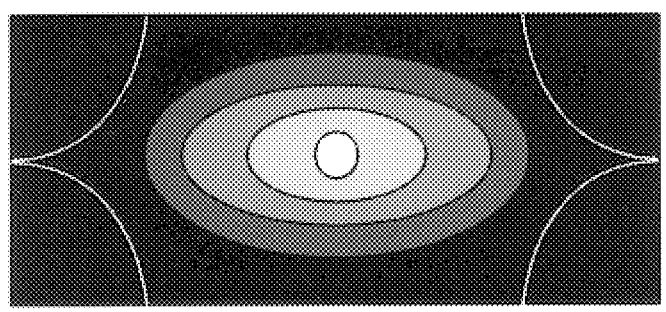
Figure 9:
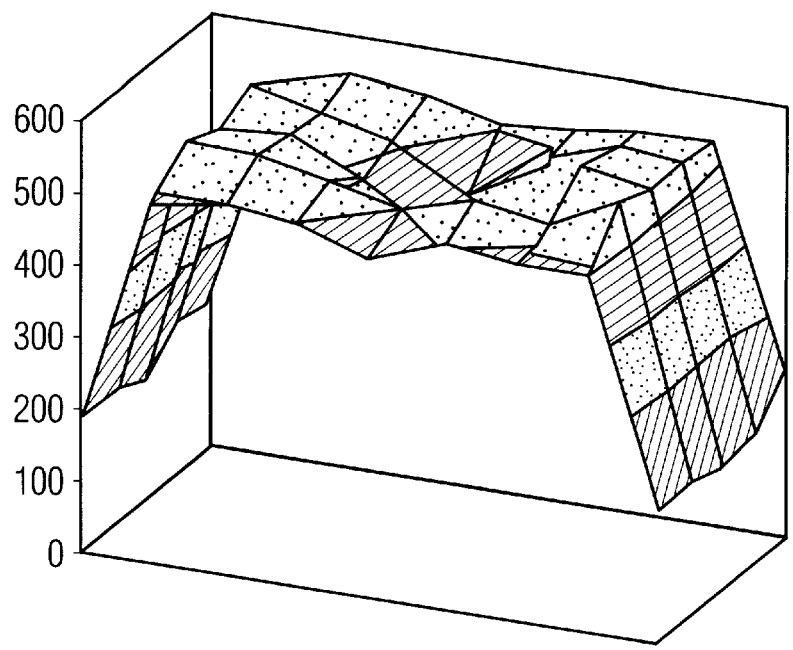
Figure 10:
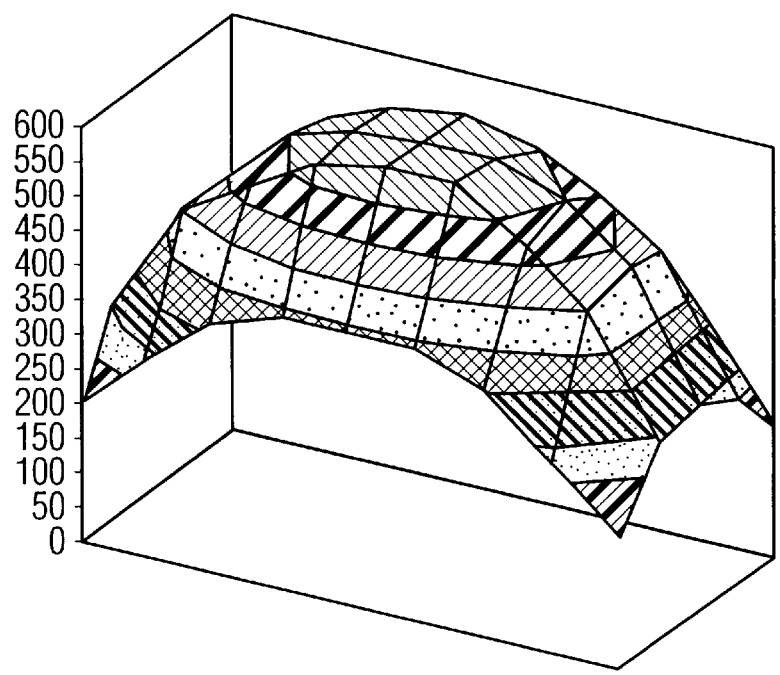

In FIG. 7b the lenses of the network RL1 are arranged so that the part of the beam transmitted by the source corresponding to the hole in the reflector are centered at the common point of four lenses. In this way the integrator is locate such that the interruption of the illumination affects several lenses, notably the four central lenses (I1 to I4). The illumination charts of the various lenses I1 to I4 are shown in FIGS. 8a to 8d; the superposition of the these illuminations is shown in FIG. 8e: there is an illumination peak at the center and the weakening of the illumination due to the hole in the reflector is spread around the edge.

In a variant of the invention, no lens is provided for the part of the beam in which there is a weakening of the illumination.

Figure 11A:
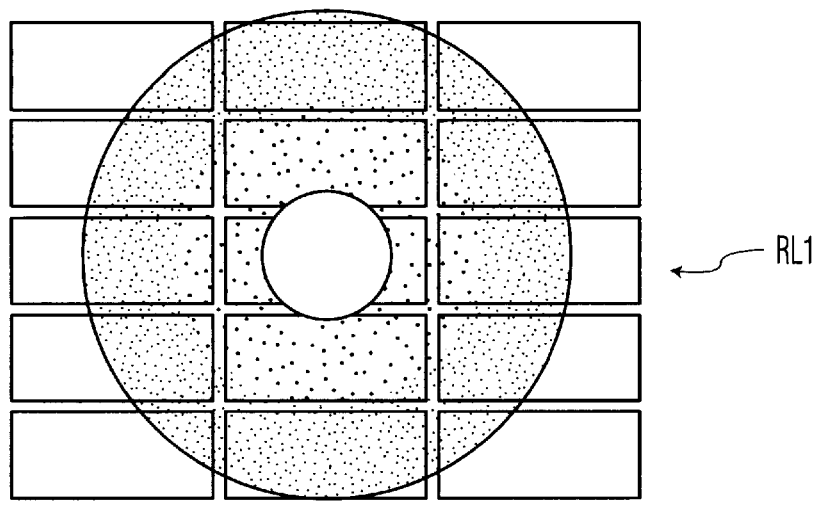

In particular, as shown in FIG. 11a, the network of lenses RL1 includes no lenses for the weak parts of the illumination beam. For example, if the reflector of the source S includes an opening in the central part, the network RL1 includes no lenses for the part of the beam that would have been reflected by this central part if there was no hole. Therefore it is preferable not to include lenses in the network RL2 corresponding to this central zone.

Figure 11B:
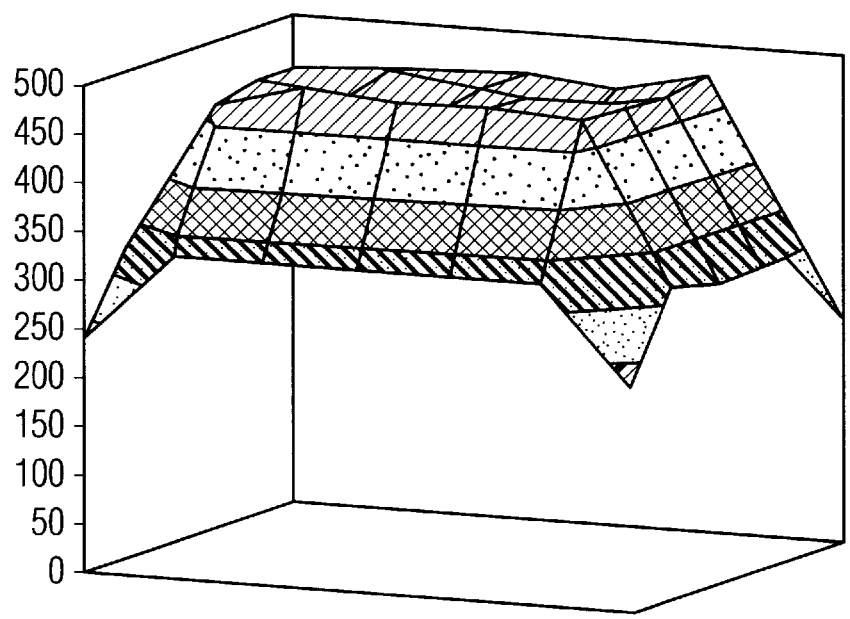

We thus obtain an illumination distribution that is more uniform, as shown in FIG. 11b.

Figure 12:
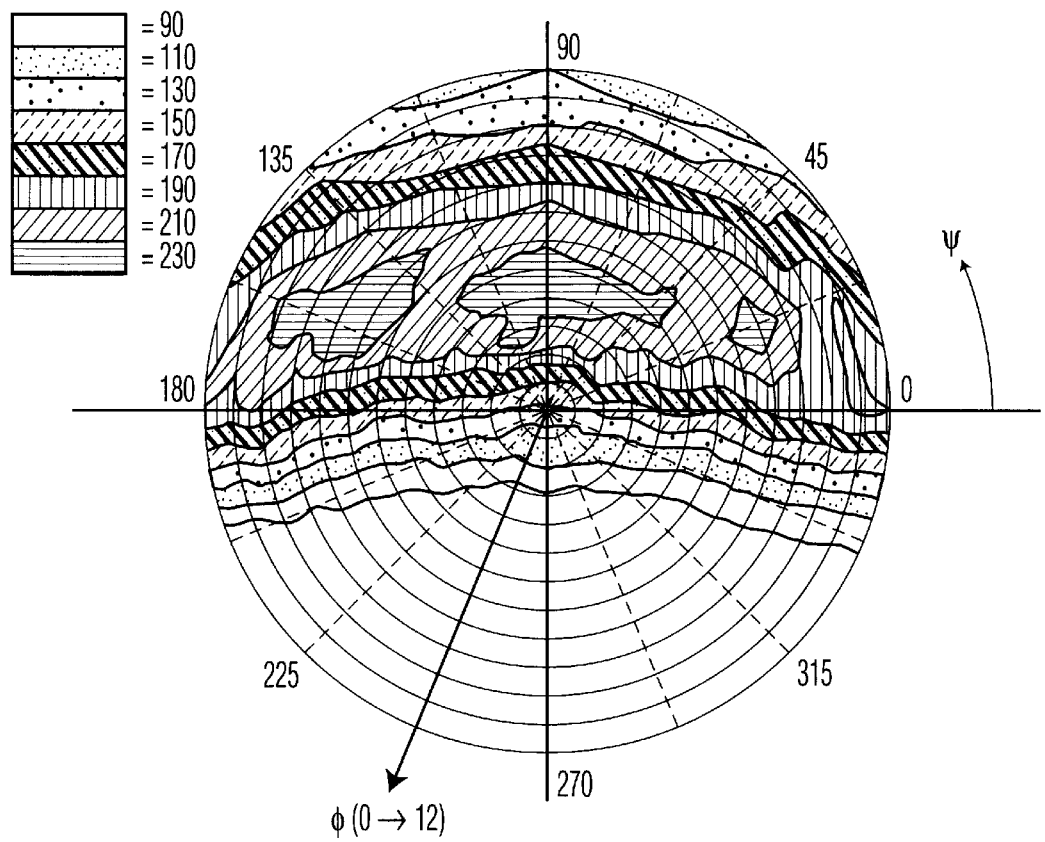
FIG. 12 shows the variation the illumination contrast of a liquid-crystal screen as a function of the angle of incidence of the illuminating beam.

The contrast of an image on the liquid-crystal screen depends on the angle of incidence of the illuminating beam because the transmission of light by such screens is anisotropic. FIG. 12 is a polar diagram showing, for such a screen, the isocontrast contours as a function of the angles of azimuth Ψ and declination Φ. It is clear in this diagram that the contrast will be maximum if the screen is turned through about 4° or 5°. It is also clear that the light emitted by the integrator for Ψ=180° to 360° tends to reduce the contrast.

In the invention, the integrator lenses are arranged to cover only the zone corresponding to Ψ=0° to 180°.

Figure 13A:
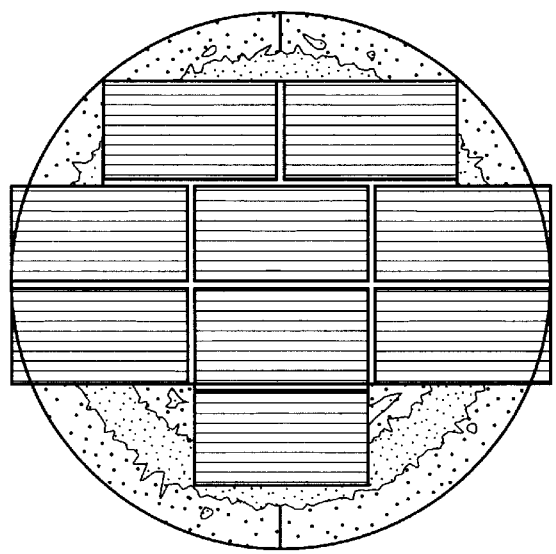
FIGS. 13a to 13e shows solutions used to improve the illumination contrast of a screen.
Figure 13B:
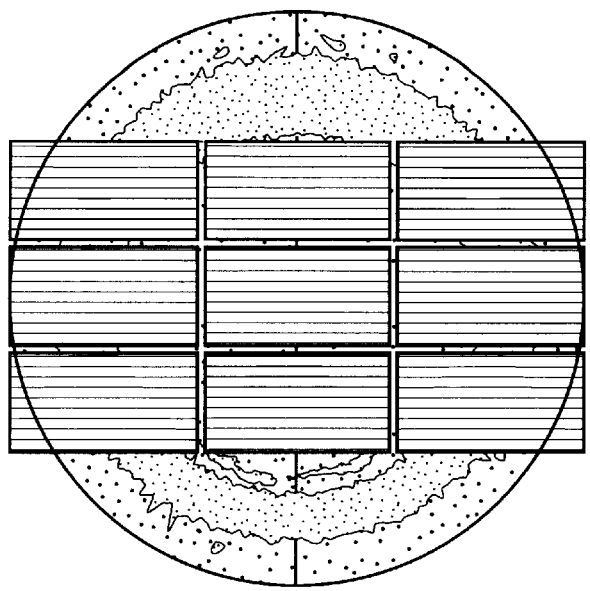
Figure 13C:
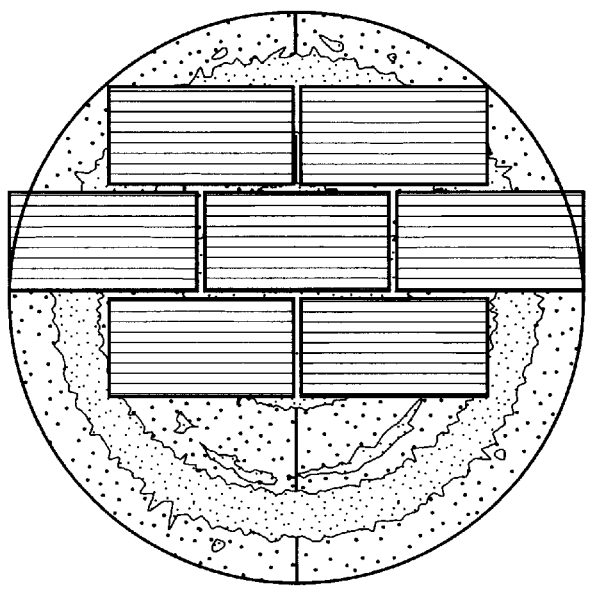
Figure 13D:
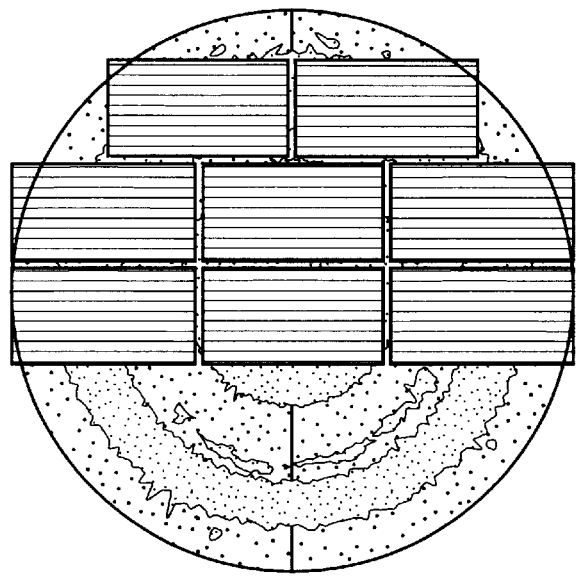
Figure 13E:
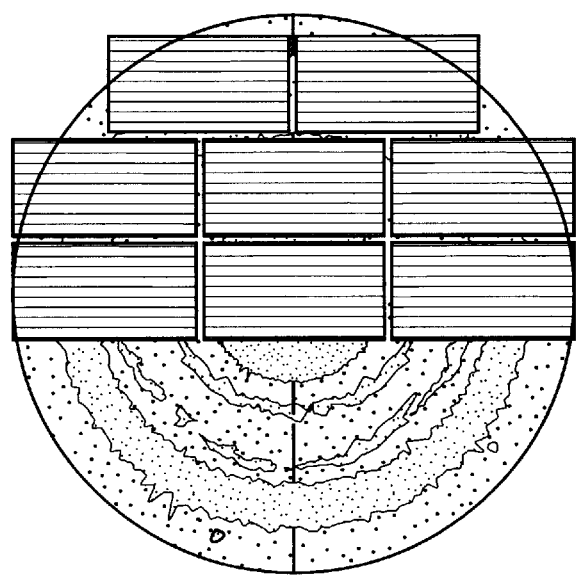

For this purpose, as shown in FIGS. 13a to 13c, the lenses of the networks RL1 and RL2 are arranged so as to cover preferentially the upper half of the beam reflected by the reflector. The arrangement in FIG. 13a enables 91% of the light from the reflector to be collected, but with low contrast. FIGS. 13b and 13c show compromises between the light collection and the contrast. FIGS. 13d and 13e show arrangements providing better contrast, but with a slight loss of energy, since the upper part of the beam is not used. Nevertheless, these arrangements may still be useful in some cases.

Figure 14A:
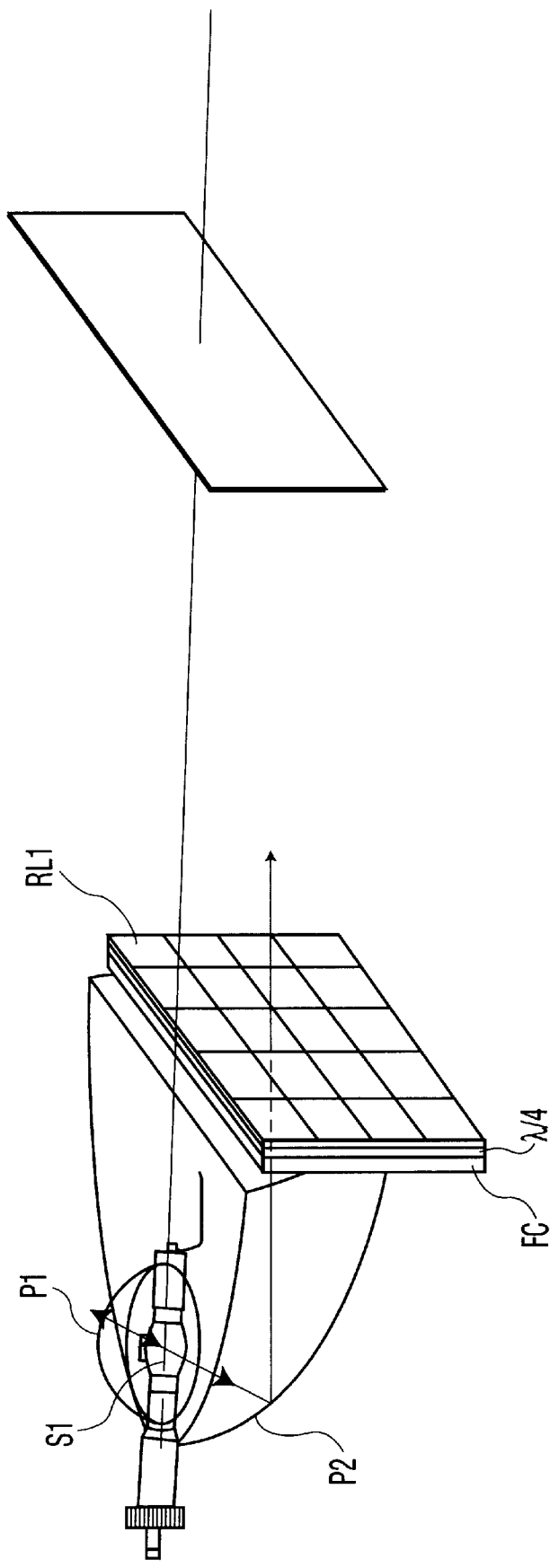
FIGS. 14a to 15b are variants of the invention that provide improved illumination contrast of a liquid-crystal screen.

We shall now describe, with reference to FIG. 14a, an application of the arrangement of the networks of lenses shown in FIG. 13e in which practically all the lenses are concentrated in the upper half of the beam. As already mentioned, in this arrangement there is a risk of loss of energy, so to overcome this disadvantage a system of optical reflectors associated with the lamp is provided that enables all the light to be directed onto the networks of lenses.

Figure 1:
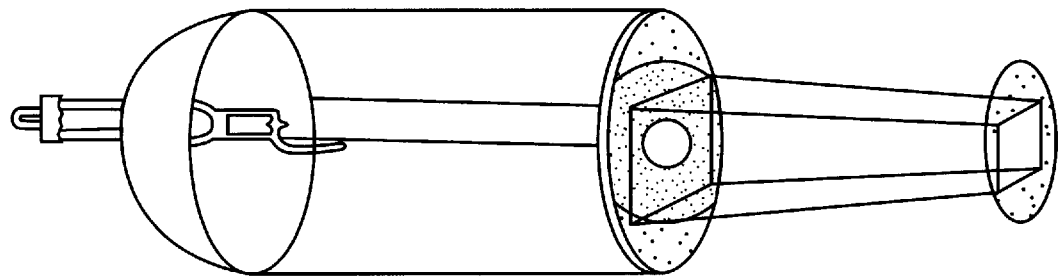
FIGS. 1 to 5 show the prior-art illumination systems described earlier.
Figure 2:
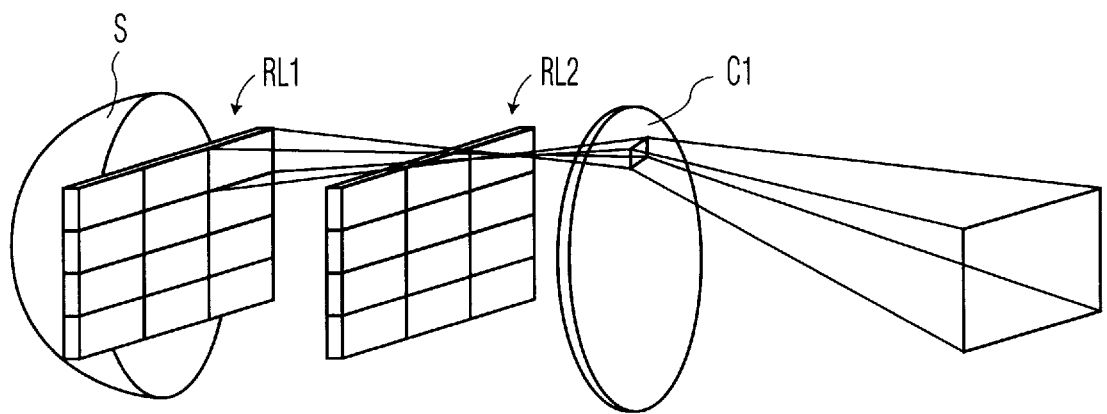
Figure 3A:
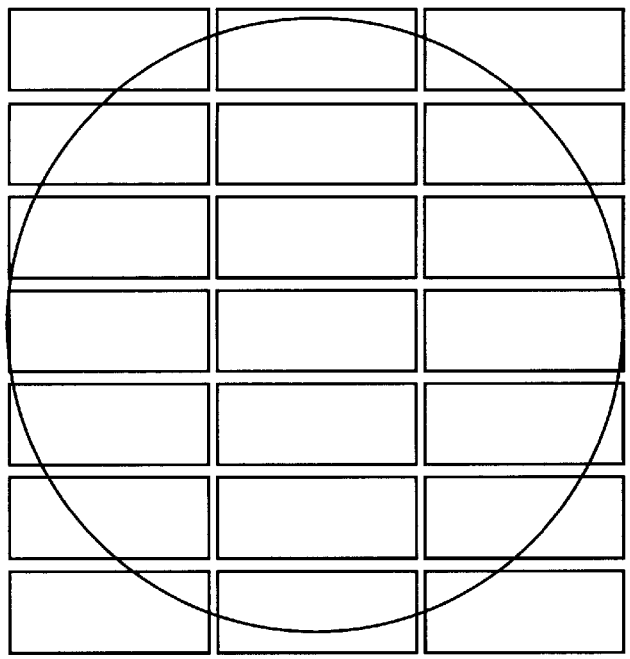
Figure 3B:
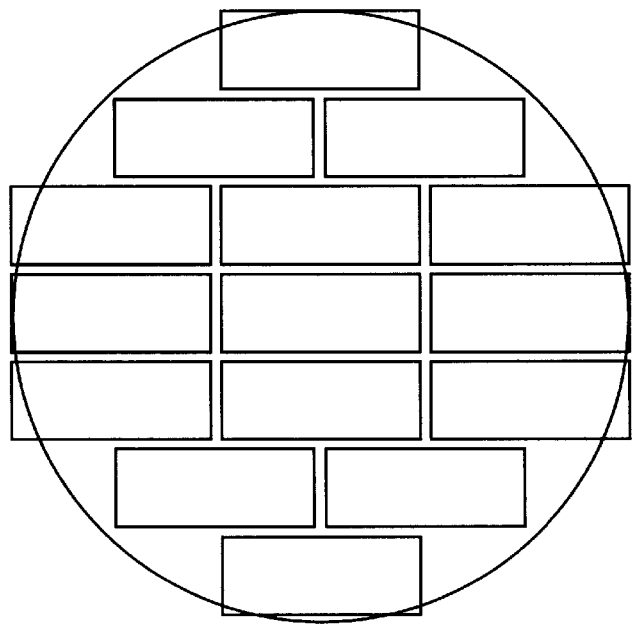
Figure 4:
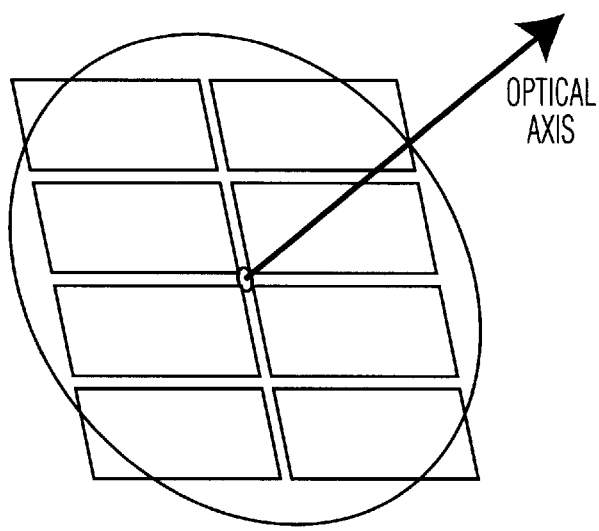
Figure 5:
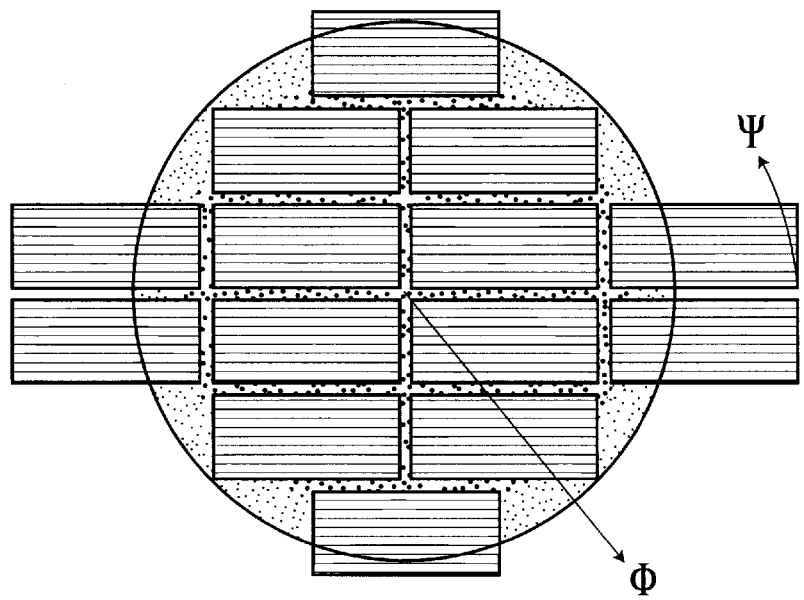
Figure 6:
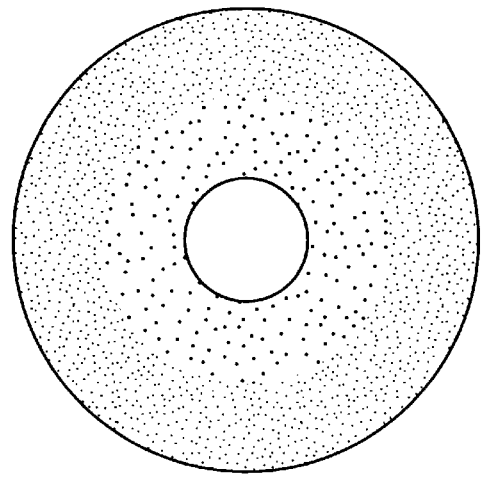
FIGS. 6 to 11b show a system according to the invention that enables the uniformity of the illumination of a screen to be varied.

A lamp S1 is located at the focus of a concave elliptical, parabolic or spherical reflector P2. Another reflector P1, preferably hemispherical, is mounted above the lamp and reflects the light onto reflector P2. As shown in FIG. 14, compared with the reflector of FIG. 1, the reflector P2 is therefore a half-reflector, that is to say that half of a reflector is used efficiently. In this manner, the liquid-crystal screen is illuminated by an incident light beam in which the part $180°<\Psi<360°$ has been eliminated.

Figure 15A:
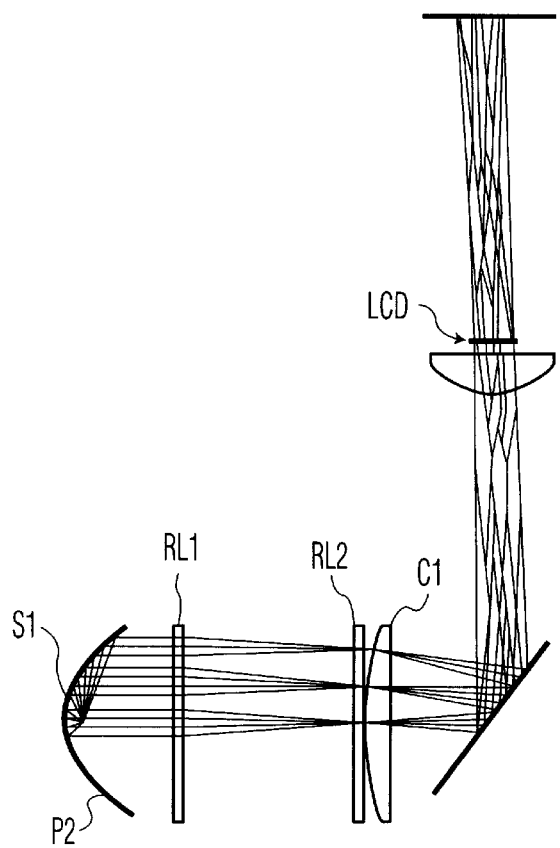
Figure 15B:
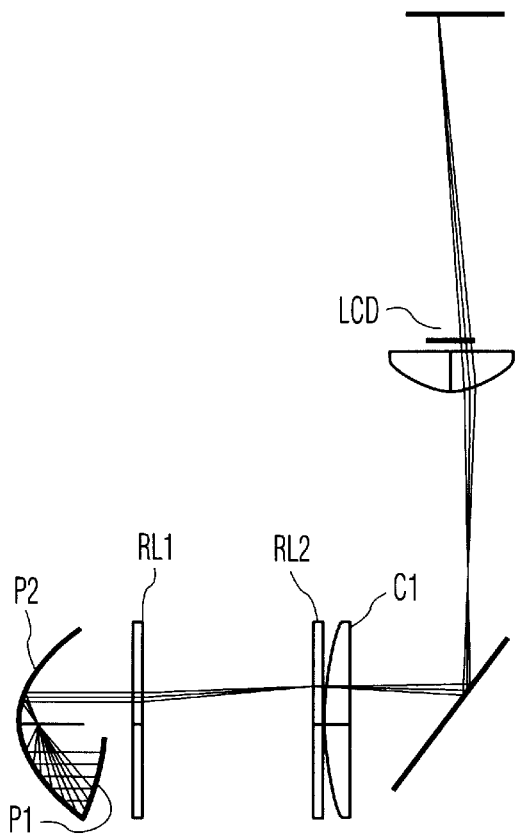
Figure 16A:
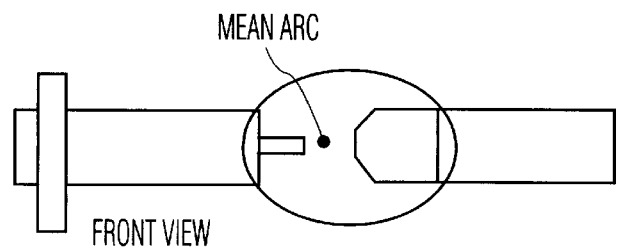
FIGS. 16a to 19c relate to various aspects of the prior art.
Figure 16B:
Figure 16C:
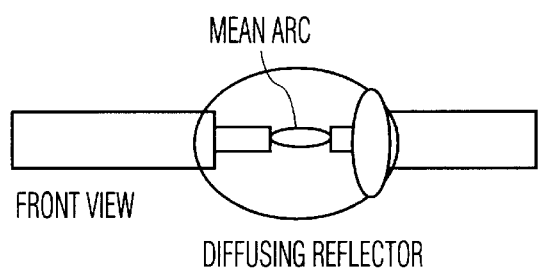
Figure 16D:
Figure 17A:
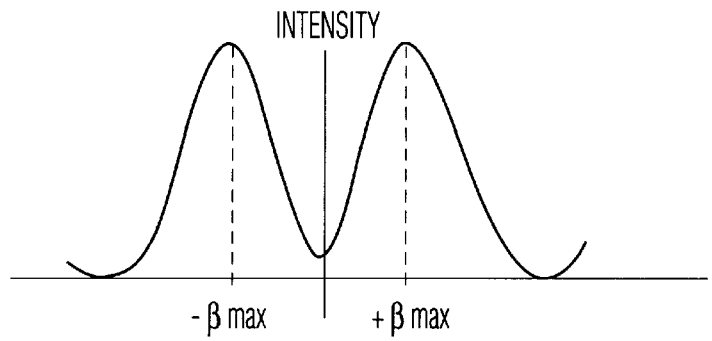
Figure 17B:
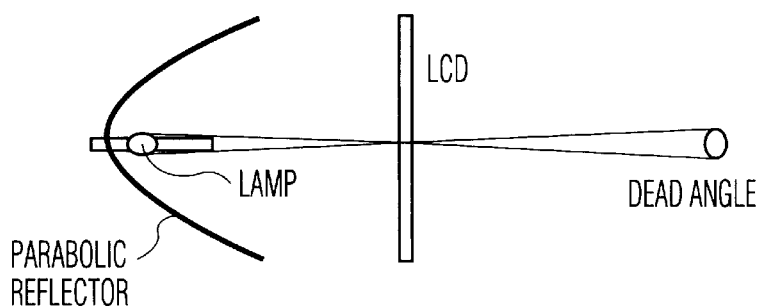
Figure 18A:
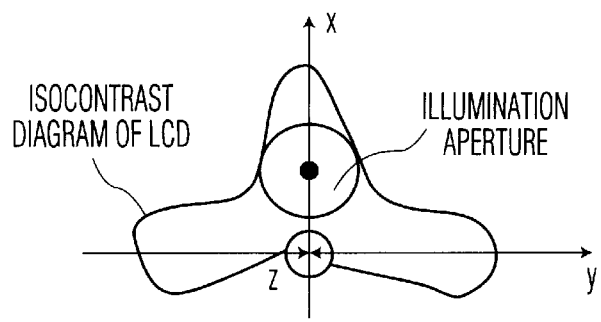
Figure 18B:
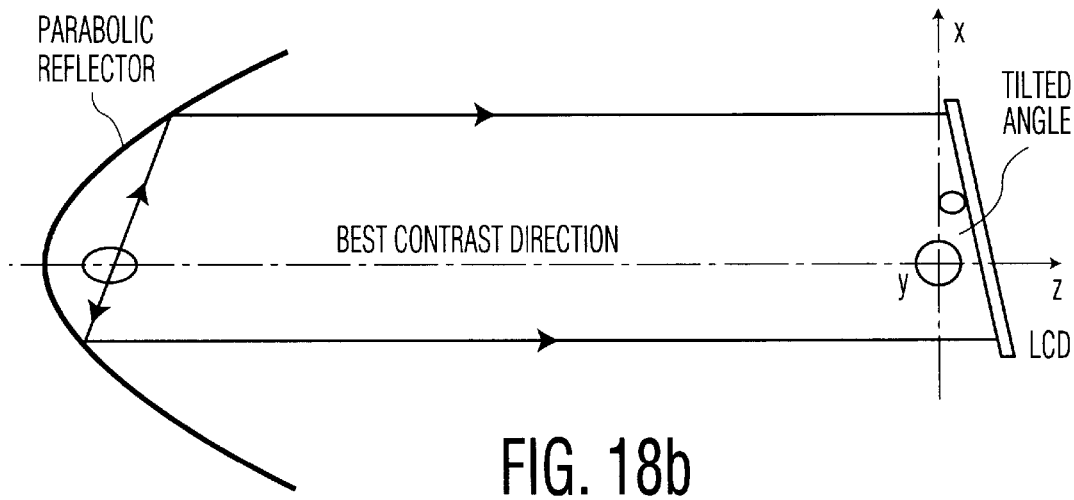
Figure 19A:
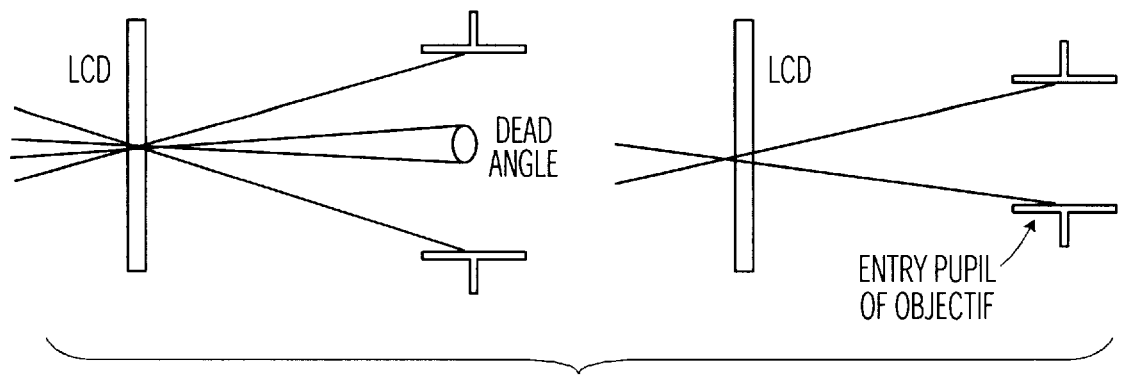
Figure 19B:
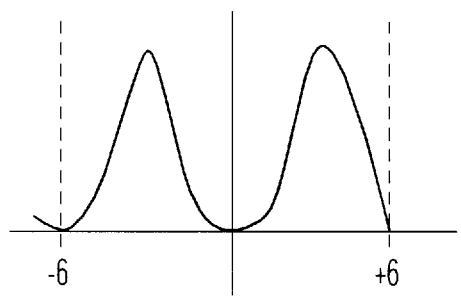
Figure 19C:
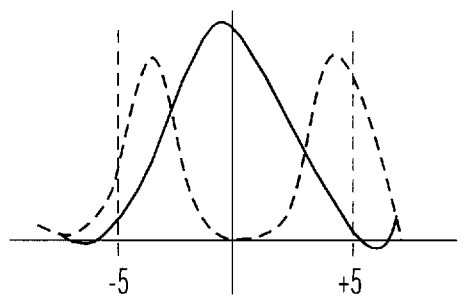

FIG. 15a and 15b show a variant of this same optical system. From the rays traced through the system we see that the rays exit only via the upper part of the reflector. On the other hand, half the beam is not lost in this case, since it is recycled via the source (FIG. 15b) by part of the reflector P1 to exit via the upper part of the reflector.

FIGS. 14a and 15b therefore illustrate two systems that provide:

a high degree of collection efficiency (integrator);

good uniformity of the illumination of the screen (integrator);

good contrast (composite reflectors P1+P2).

Figure 14B:
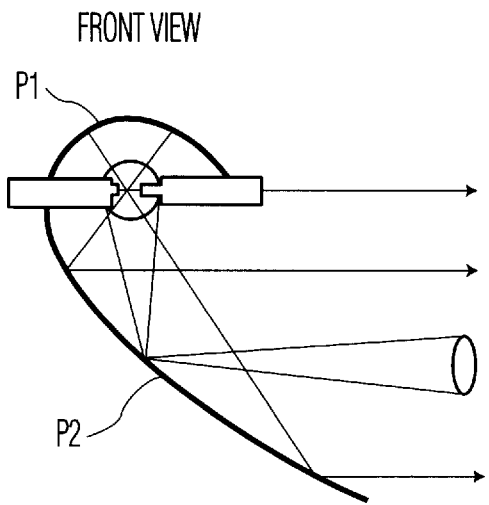
Figure 14C:
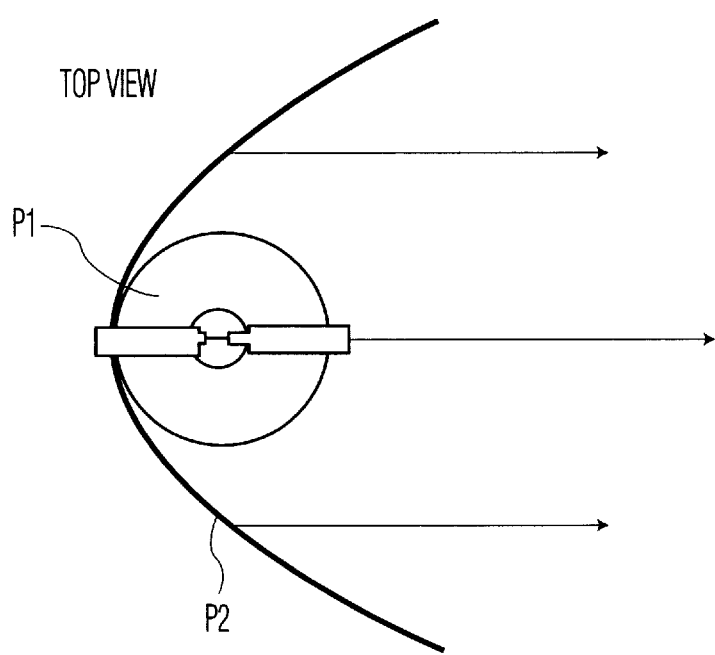

The system proposed is shown schematically in FIGS. 14a to 14c by means of various views: a 3D view, and top and side views. This system comprises two reflectors P1 and P2. One (P2) is the equivalent of half of a parabolic reflector; the other (P1) is a spherical reflector. The half of the parabolic reflector P2 functions as in a classical system: the lamp is positioned at the focus of this reflector. The same applies for the spherical reflector P1: the focus is at the center of the lamp S1.

The emission lobe of the lamp (in the form of a butterfly) is rotationally symmetrical about the optical axis. If a ray is emitted by the lamp on the reflector P1 side it returns via the source after reflection by the spherical mirror. The ray then behaves as if it emanated directly from the source and is reflected by the parabolic reflector P2.

Figure 14D:
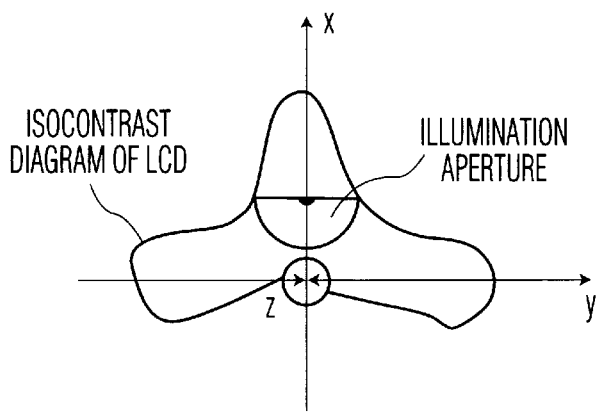
Figure 14E:
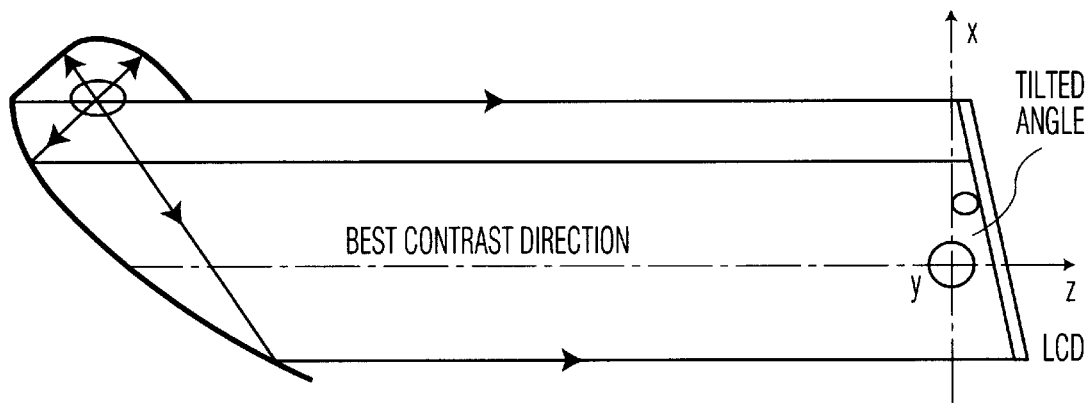
Figure 14F:
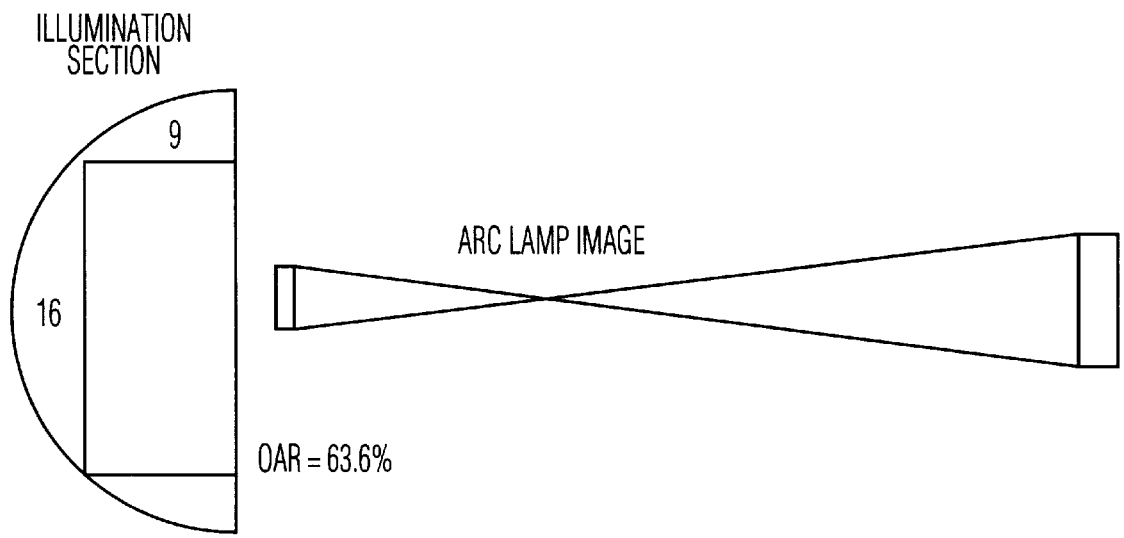
Figure 14G:
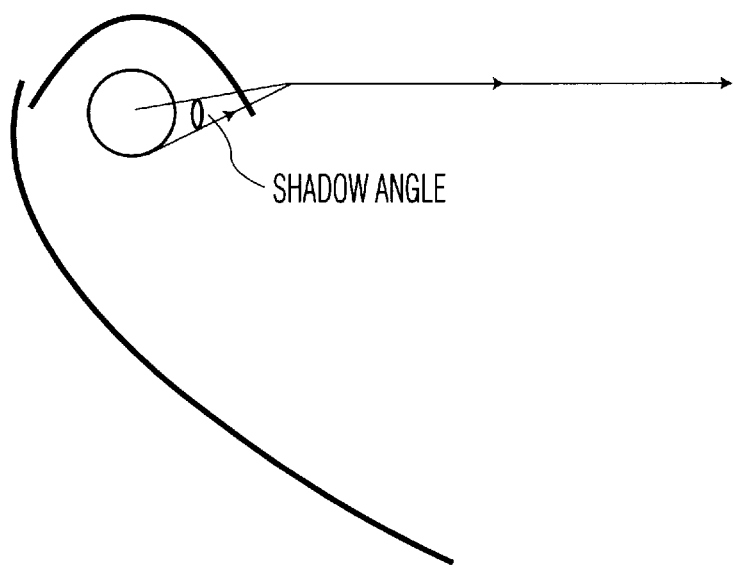

We notice in FIGS. 14d and 14g the form of the illumination section: if the liquid-crystal cell is in 16/9 format, the coverage of the 16:9 rectangle inscribed in a semi-circle is about 64%, which represents a gain of about 18% over the classic situation.

In addition, the source normally approximated by a cylinder (for a clear lamp or a slightly diffusing lamp at the start of its life) implies here that the illumination cone will have a distribution closer to this cylinder than in the classic situation, and more suitable for the contrast conoscope of a TN liquid-crystal cell. This system therefore provides a more optimized illumination and avoids the dead angle associated with classical illumination.

The spherical reflector P1 is in fact a hemisphere whose center is the focal point of the parabolic reflector P2 (FIG. 14b). The nature of this reflector is of the same type as that used for the parabolic reflector, i.e. a cold mirror. This spherical reflector images the arc of the lamp at the same point (object and image superimposed).

In the case of a short arc lamp of xenon type, the quartz envelope is clear and the hot point of the emission is approximately spherical (for example, a radius of about 2 mm for a power of 150 W) and can be imaged on the same hot point, despite a small loss of flux absorbed by the electrodes. In the opposite case, when the total image and object are superimposed, the image of the source forms with the new source a more homogeneous arc then previously, although the new source is somewhat less localized.

In the case of a metallic halogen arc, it is preferable that the lamp be clear (non-diffusing) to enable the light reflected by the spherical reflector to pass through the arc and exit via the parabolic reflector.

Unlike a xenon type source with a DC power supply, in which the hot point is closer to the cathode, in an AC-supplied metallic halogen source the arc is more or less cylindrical, occupying all the space between the two identical electrodes. The image of this source through the spherical reflector must always be exactly superimposed on the object in order to avoid any absorption of the reflected light by the electrodes.

In fact it is preferable that the parabolic reflector is not the exact equivalent of a true parabolic reflector cut in two, but a little more than half. The reason is that the angular shift: the shadow angle makes it possible to avoid losing part of the light radiated by the lamp (see FIG. 14g).

FIG. 14a shows the system proposed. A composite cholesteric filter FC (with three superposed filters: red, green and blue) receives light at a normal angle of incidence. It plays the role of polarization separator (and therefore of polarizer). The non-polarized beam emanating from the source is divided in two. A circularly polarized part (left or right) is transmitted through the filter FC, the other circularly polarized part (right or left) is reflected and returns to the source S1. This part is first reflected by the parabolic reflector P2, passes through the lamp, is reflected normally from the spherical reflector P1, passes through the lamp again and reflects from the parabolic mirror P2. This series of three reflections results in a change in the state of polarization, the polarization on the return being the right circular if the light coming back to the source is left circular (and vice versa). In this way a large part of the light emitted by the lamp is transformed into useful polarization for the liquid-crystal cell.

In order to take reasonable account of the phase shift introduced by the reflectors this shift must first be calculated so that it can then be compensated by a retardation plate set perpendicularly to the optical axis, covering all the output zone of the reflector and positioned between the reflector and the cholesteric filter. The retardation value must be chosen so as to convert a maximum proportion of the light flux from the source to the right polarization. The phase shift introduced by the parabolic reflector is inherent to all purely metallic surfaces for large angles of incidence and is also an intrinsic property of multi-coated surfaces (cold mirror type).

Finally, the achromatic quarter-wave plate placed after the cholesteric filter will convert the circular polarization into linear polarization, adapted to the electro-optical properties of the liquid-crystal valve.

We note that the utilization of cholesteric filters as polarization separation components is due to the following advantages:

angular acceptance that is compatible with the geometric size of metallic halogen arc lamps;

cholesteric filters can be placed near the source and can resist high temperatures;

the pass band (about 50 mm to 80 mm) and the polariztion rate are acceptable.

The system according to the invention therefore enables the illumination to be optimized: first, the distribution of the intensity within the solid illumination angle is better and, secondly, the section of the illumination provides better coverage for a cell of 16/9 format. The use of a polarizing component of the cholesteric filter type enables the source to be prepolarized.

After the cholesteric filter an (achromatic) quarter-wave plate can be included to convert the circular polarization into linear polarization which can then be modulated by the liquid-crystal screen.

What is claimed is:

1. A device for Illumination of a first surface, including a light source emitting a beam in a given direction comprising a light source and a reflector;

a set of lenses forming a second surface perpendicular to the direction of the beam, each lens focusing the light of the beam on a point or line of a third surface; and lenses located on said third surface, each one imaging the light from one or more lenses of said set of lenses onto said first surface to be illuminated;

wherein the lenses forming the second surface which does not include individual lenses in a section of the light beam emitted by said light source.

2. Illumination device according to claim 1, wherein said lenses of said sets of lenses cover only one side of a plane containing the optical axis of the device and wherein said source includes a system of reflection comprising a first mirror reflecting the light of a lamp towards a second concave mirror, the perpendicular section of the beam reflected from said system of reflection lying on one side only of said plane.

3. Illumination device according to claim 2, wherein said system of reflection includes a first mirror reflecting the light of a lamp towards the second concave mirror, the perpendicular section of the beam reflected from this second mirror lying on one side of said plane.

4. Illumination device according to claim 3, wherein said first mirror and said second mirror are both hemispheric, semi-parabolic or semi-hyperbolic.

5. Illumination device according to claim 4, wherein:

said first mirror is hemispheric, semi-parabolic or semi-hyperbolic;

said second mirror is hemispheric, semi-parabolic or semi-hyperbolic;

the focal points of said first mirror and said second mirror substantially coincide;

said first mirror and said second mirror are located on opposite sides of a plane containing the flat section of the hemisphere;

said light source is located substantially at the focal point of said first mirror and said second mirror.

6. Illumination device according to claim 5, wherein said second mirror also includes more than half of a hemispheric, semi-parabolic or semi hyperbolic mirror.

7. Illumination device according to claim 3, including a reflection polarization filter located on the path of the light reflected by said system of reflection.

8. Illumination device according to claim 7, wherein said polarization filter is a cholesteric filter.

9. Illumination device according to claim 7, including a quarter-wave plate between said polarization filter and said first surface.

10. Illumination device according to claim 7, wherein the light from said lamp undergoes an odd number of reflections from said system of reflection, such that the light that was initially polarized in one direction is polarized in the opposite direction when it returns to said filter.

11. Illumination device according to claim 10, wherein said polarization filter is a cholesteric filter.

12. An illumination device according to claim 1, wherein the set of lenses does not include lenses in the section of the beam that carry the least light energy.

13. An illumination device according to claim 1, wherein said lenses forming the second surface Include lenses substantially covering half a section of said beam emitted by said light source.

* * * * *